United States Patent [19]
Nanba et al.

[11] 3,756,130
[45] Sept. 4, 1973

[54] EXPOSURE TIME CONTROL DEVICE IN A THROUGH THE LENS TYPE SINGLE REFLEX CAMERA

[75] Inventors: Yasuhiro Nanba, Toyokawa; Masayoshi Sahara, Sakai; Kintaro Yada, Ikeda, all of Japan

[73] Assignee: Minolta Camera Co., Ltd., Osaka-shi, Osaka-fu, Japan

[22] Filed: Apr. 7, 1971

[21] Appl. No.: 132,104

[30] Foreign Application Priority Data
Apr. 7, 1970  Japan.............................. 45/29019
Apr. 7, 1970  Japan.............................. 45/29020

[52] U.S. Cl. ............................................ 95/10 CT
[51] Int. Cl. ............................................ G03b 7/08
[58] Field of Search................................ 95/10 CT

[56] References Cited
UNITED STATES PATENTS
3,641,890   2/1972   Ono ......................................... 95/10
3,670,637   6/1972   Mori et al. ............................... 95/10
3,324,779   6/1967   Noleusawa et al. ...................... 95/10
3,490,835   1/1970   Nemeth et al. ...................... 95/10 X

FOREIGN PATENTS OR APPLICATIONS
18,672    8/1969   Japan..................................... 95/10

Primary Examiner—Joseph F. Peters, Jr.
Assistant Examiner—Michael L. Gellner
Attorney—Watson, Cole, Grindle & Watson

[57] ABSTRACT

First and second output voltages are generated respectively in accordance with the logarithm of the intensity of light and as a function of a manually set exposure condition. A control signal to initiate shutter closing is generated when a signal which changes in proportion to the logarithm of an elapsed time period initiated by shutter release operation plus the second output voltage is substantially equal to the first output voltage. The control device includes a circuit for comparing the voltages. The device may be modified to generate a third output voltage which changes in response to the change of the signal and then comparing the first output voltage with the second plus the third output voltage.

10 Claims, 10 Drawing Figures

INVENTOR.
Yasuhiro Nanba
BY Masayoshi Sahara
Kintaro Yada
Watson, Cole, Grindle & Watson

EXPOSURE TIME CONTROL DEVICE IN A THROUGH THE LENS TYPE SINGLE REFLEX CAMERA

BACKGROUND OF THE INVENTION

The present invention relates to an exposure time control device in a "through the lens" type single reflex camera. In a single reflex camera it is impossible to do photometry while in exposure, so that the photometric value prior to exposure is memorized by a memory condenser so as to control the exposure through said memory voltage. However, in order to memorize a wide range of the object brightness in the memory condenser a means has been adopted for giving a logarithmic compression to the illuminance on the light receiving surface of a photoconductive element and memorizing the voltage given said logarithmic compression in the memory condenser.

And, up to the present time, when the exposure is controlled through said memory voltage the memory voltage given said logarithmic compression is given the inverse logarithmic conversion by a logarithm elongation element and the exposure control circuit is operated by the output thereof.

However, in the case of that the inverse-logarithmic conversion is given by the logarithm elongation element the voltage variation quantity given the logarithmic compression for giving 1 EV of variation to the exposure value through the output elongated is restricted by the characteristic of said logarithm elongation element, and as the result the voltage variation quantity for 1 EV in progress of the logarithmic compression is very small, therefore, errors are easy to intervene, resulting in dropping remarkably the precision in progress of the logarithm elongation.

OBJECT OF THE INVENTION

One object of the present invention is to provide an exposure time control device in a "through the lens" type single reflex camera, which is removed from the prior drawbacks mentioned above and controls the exposure time without giving the inverse-logarithmic conversion to the memory voltage given the logarithmic compression.

Another object of the present invention is to provide an exposure time control device in a "through the lens" type single reflex camera, which is able to set up optionally the voltage variation quantity per 1 EV in the logarithmic compression progress.

Further another object of the present invention is to provide an exposure time control device in a "through the lens" type single reflex camera, which is so formed that the memory voltage given said logarithmic compression is compared with the output voltage of the reference time integrating circuit which output voltage increases in proportion to the logarithmic value of the time from the exposure starting by means of a comparison circuit, and when said both voltages coincide with each other the exposure is ended and controlled.

Still further another object of the present invention is to provide an exposure time control device in a "through the lens" type single reflex camera, which is so formed that as a comparison circuit a differential amplifier circuit is put to use, and to the emitter and collector circuits of a transistor having the memory voltage of the memory condenser as one input of said differential amplifier circuit and the fixed base electric potential as the other input, condensers are respectively connected, and the charging voltage of the condenser in said collector circuit is impressed and when both input voltages become equal the output of said differential amplifier circuit operates the switching circuit for the exposure control circuit.

Still further another object of the present invention is to provide an exposure time control device in a "through the lens" type single reflex camera, which controls the exposure corresponding to photographic conditions by connecting a bias resistance for film sensitivity change and stop value change to an input condenser impressed in said differential amplifier circuit.

Still further another object of the present invention is to provide an exposure time control device in a "through the lens" type single reflex camera, which compensates the fluctuation of an electric power source voltage.

SUMMARY OF THE INVENTION:

In order to attain the above-mentioned objects, the present invention relates to an exposure time control device in a "through the lens" type single reflex camera, which is so constructed that there are provided a memory condenser for memorizing the output voltage of a photometric circuit for detecting the voltage proportional to the logarithmic value of the illuminance on the light receiving surface of a photoconductive element prior to exposure, and a reference time integrating circuit which output voltage increases in proportion to the logarithmic value of the time from the exposure starting, and to one side of a comparison circuit the memory voltage of said memory condenser is input and to the other side of said comparative circuit the output voltage of said reference time integrating circuit is input, and said both voltages are compared to each other by said comparison circuit and when they coincide with each other the output of said comparison circuit operates an exposure time control circuit; wherein since the comparison circuit compares the voltage proportional to the logarithmic value of the illuminance on the light receiving surface of the photoconductive element directly with the voltage proportional to the logarithmic value of the exposure time the device has no need of a means for converting the memory voltage of the memory condenser to the inverse logarithm.

Figure 1:
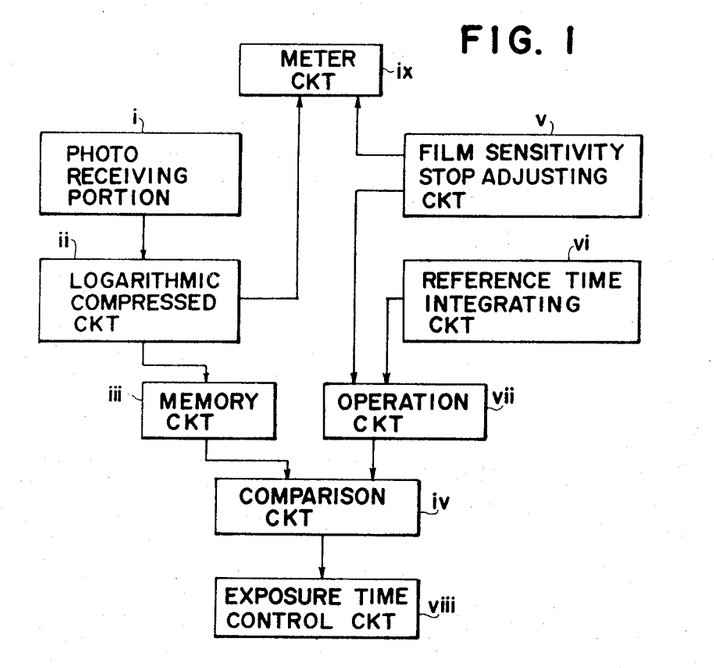
FIG. 1 is a block diagram of the circuit showing the fundamental formation of the present invention.

DESCRIPTION OF THE PREFERRED EMBODIMENT:

FIG. 1 shows the principle of the present invention, wherein the information of brightness of an object coming into photoreceiving portion (i) is compressed by logarithmic compressed circuit (ii) and then comes into memory circuit (iii). Just prior to exposure, photoreceiving portion (i) is disconnected from memory circuit (iii) and the information of brightness of the object just prior to photographing is memorized by memory circuit (iii), however, it is memorized by receiving the logarithmic compression so that it is possible to be memorized in good precision to the object brightness covering a wide range coming up to scores of thousands times between the highest and the lowest.

The information memorized by memory circuit (iii) comes into comparison circuit.

The information in film sensitivity and stop adjusting circuit (v) comes into operation circuit (vii) together with the information in reference time integrating circuit (vi) which output is in proportion to the logarithmic value of the time from the exposure starting, to be operated therein, and the information in operation circuit (vii) comes into comparison circuit (vi) to be compared with the information in the memory circuit (iii), and when the information in operation circuit (vii) becomes equal to the information in memory circuit (iii) the relay for exposure time control circuit (viii) is reversed and the exposure time is controlled.

The information of the object brightness in logarithmic compressed circuit (ii) and the information in film sensitivity and stop adjusting circuit (v) come also into meter circuit (ix) to indicate the shutter speed.

Figure 2:
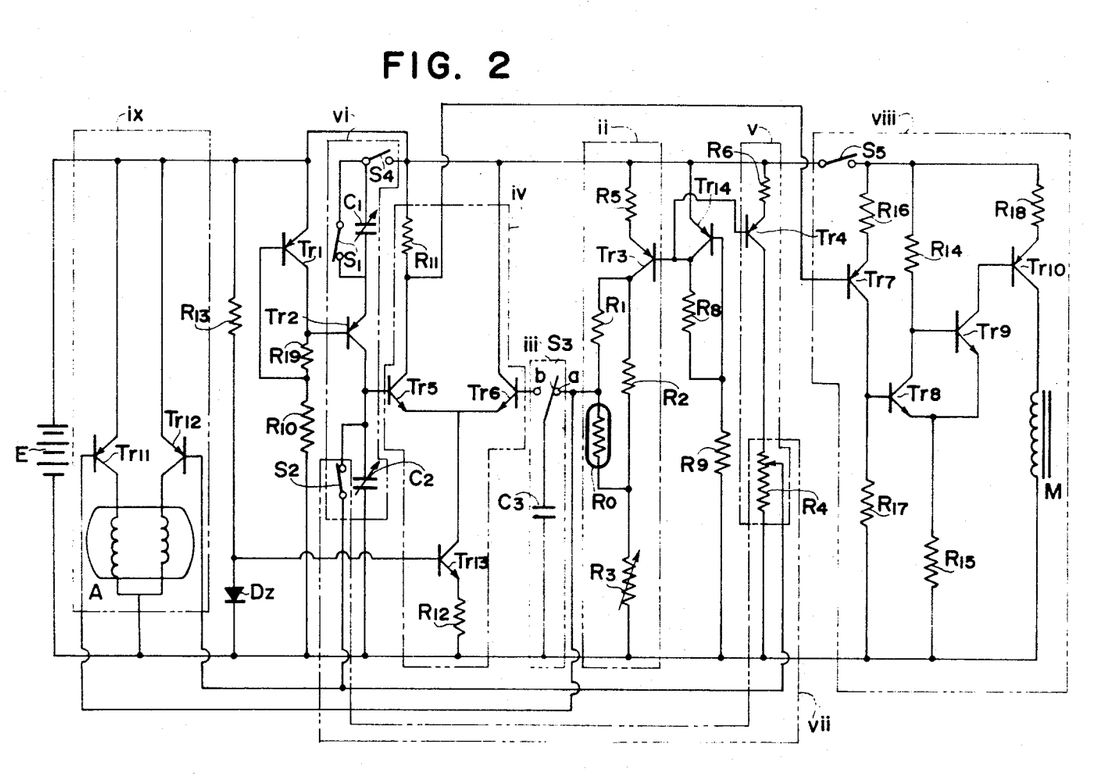
FIG. 2 is the exposure time control circuit diagram in the exposure time control device in a "through the lens" type single reflex camera in accordance with the present invention.

FIG. 2 shows the exposure time control circuit of an embodiment in accordance with the present invention.

Figure 5:
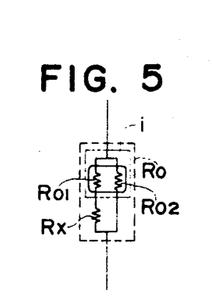
FIG. 5 is a circuit diagram of the composite photoconductive element showing an example of the light receiving element in the present invention.

Photoconductive element $R_o$ is composed of, as shown in FIG. 5, two photoconductive elements $R_{o1}$, $R_{o2}$ composed of a composite photoconductive element and constituting photoreceiving portion (i) and disposed in parallel with each other, and fixed resistance $R_x$ connected in series to photoconductive element $R_{o1}$. The connection point between said composite photoconductive element $R_o$ and fixed resistance $R_1$ connected in series thereto is connected to contact a for change over switch $S_3$ in memory circuit (iii), and said resistance connection bodies $R_o$, $R_1$ are connected to the collector circuit of transistor $Tr_3$ together with resistance $R_2$ in parallel therewith and variable resistance $R_3$ in series thereto, and the emitter of said transistor $Tr_3$ is connected to the positive side of electric power source E through resistance $R_5$ to constitute logarithmic compressed circuit.

Transistor $Tr_4$ having the same base electric potential as that of said transistor $Tr_3$ is a transistor of the identical characteristic and the same electric current runs through them, and by variable resistance $R_4$ connected to the collector of said transistor $Tr_4$ adjusting circuit (v) for changing the film sensitivity and stop value is constituted.

To the emitter and the collector of transistor $Tr_2$ having the fixed base electric potential by connecting its base to the collector of first step compensation transistor $Tr_1$ which connects resistance $R_{19}$ between the base and the collector and resistance $R_{10}$ to the base as a bias resistance, condensers $C_1$, $C_2$ are respectively connected, and between said condenser $C_1$ and the positive side of electric power source E there is provided trigger switch $S_4$ which is ordinarily opened and closed simultaneously with starting of the shutter opening operation; and in parallel with said both condensers $C_1$, $C_2$ discharge switches $S_1$, $S_2$ are respectively provided; and the charging voltage of condenser $C_2$ in reference time integrating circuit (vi) connected to operation circuit (vii) composed of variable resistance $R_4$ connected in series to said discharge switch $S_2$ and disposed in said film sensitivity and stop adjusting circuit (v) is input into the base of transistor $Tr_5$ in the differential amplifier circuit as the first input, and contact b for change over switch $S_3$ in said memory circuit (iii) is connected to the base of transistor $Tr_6$ as the second input, and the emitters of both transistors $Tr_5$, $Tr_6$ are connected to the collector of transistor $Tr_{13}$, and to the emitter of said transistor $Tr_{13}$ resistance $R_{12}$ is connected, and the base of said transistor $T_{13}$ is connected to the connection point between resistance $R_{13}$ and diode $D_2$ to compensate the temperature, and to the collector of said transistor $Tr_5$ resistance $R_{11}$ is inserted, and thus comparison circuit (iv) is formed.

As for exposure time control circuit (viii), main switch $S_5$ of electromagnetic coil M is provided to electric power source E and a Schmidt circuit composed of $Tr_7$, $Tr_8$, $Tr_9$, and $Tr_{10}$ is formed, and to the base of transistor $Tr_7$ on the input side thereof the collector of transistor $Tr_5$ in said comparison circuit (iv) is connected and to the collector of Transistor $Tr_{10}$ on the output side thereof said electromagnetic coil M is connected, and the moment main switch $S_5$ is closed transistors $Tr_9$, $Tr_{10}$ are electrified and electromagnetic coil M is excited, and the moment transistor $Tr_5$ in the differential amplifier circuit is reversed transistors $Tr_7$, $Tr_8$ are electrified and transistors $Tr_9$, $Tr_{10}$ are cut off and the excitation of electromagnetic coil M is stopped and accordingly closing operation of the shutter is started.

Meter circuit (ix) is provided with two amplifier transistors $Tr_{11}$, $Tr_{12}$ to give the logarithmic elongation by the electric current to the electric potential at contact a for said change over switch $S_3$ and the bias voltage of condenser $C_2$ in reference time integrating circuit (vi), and composed of double coil ammeter A which coils are wound to the opposite direction so as to indicate the difference between the electric potential at contact a and the bias voltage of condenser $C_2$, namely, the shutter speed.

Figure 3:
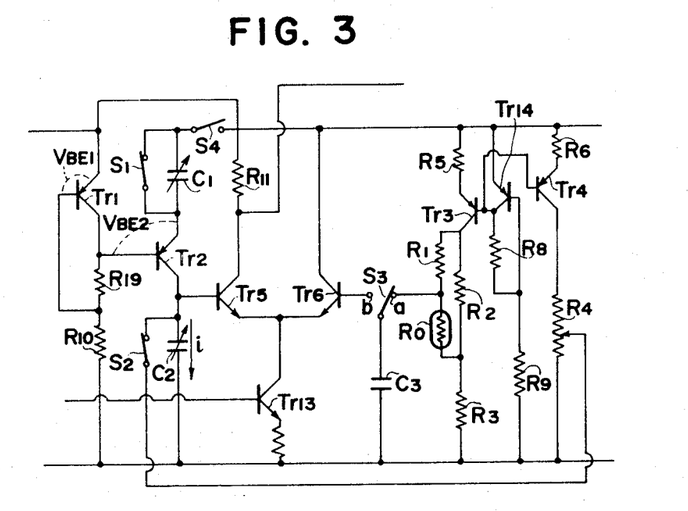
FIG. 3 is an enlarged circuit diagram of the essential portion of said circuit.

FIG. 3 is a partial view of FIG. 1 and shows the essential portion according to the present invention. At the first stage of the shutter release switches $S_1$, $S_2$ are cut off and when trigger switch $S_4$ is electrified simultaneously with starting of the shutter opening operation the charging to condensers $C_1$, $C_2$ is started.

Now, let us think over how charging voltages $V_1$, $V_2$ of condensers $C_1$, $C_2$ change in the lapse of time from the time when trigger switch $S_4$ is electrified, that is, the shutter starts to open. Provided the voltage between the base and the emitter of transistor $Tr_1$ is $V_{BE1}$, this turns to the base electric potential of transistor $Tr_2$, and the resistance value of resistance $R_{19}$ is for compensating the voltage and so small as negligible, so that provided the charging voltage of condenser $C_1$ is $V_1$, voltage $V_{BE2}$ between the base and the emitter of transistor $Tr_2$ is as follows:

$$V_{BE2} = V_{BE1} + V_1 \quad (1)$$

and collector current $i$ of transistor $Tr_2$ is as follows:

$$V_{BE2} = V_0 \log i + V_1$$

wherein $V_0$, $V_1$ are respectively a proportion constant of transistor $Tr_2$.

And, provided the capacity of condenser $C_1$ is $C_1$, charging voltage $V_1$ is as follows:

$$V_1 = \frac{1}{C_1} \int_0^t i\, dt$$

Therefore, from formula (1) the following formula is obtained;

$$V_{BE2} = V_0 \log j + V_1 + \frac{1}{C_1} \int_{0_0}^t i\, dt \quad (2)$$

In order to look for the relation between $i$ and $t$, upon differentiating said formula (2) with $t$, $$0 = V_0 \frac{1}{i} \frac{di}{dt} + \frac{1}{C_1} \int - \frac{1}{C_1 V_0} dt = \int \frac{1}{i^2} di - \frac{1}{C_1 V_0} = -\frac{1}{i} + K \quad (3)$$

Provided that the characteristics of transistors $Tr_1$, $Tr_2$ are identical and the current running through $Tr_1$ is $I_0$, the collector current of transistor $Tr_2$ at the moment trigger switch $S_4$ is electrified (namely, $t=0$) turns also to $I_0$, so that $K$ of said formula (3) is as follows:

$$K = 1/I_0$$

Therefore, from formula (3)

$$t/C_1 V_0 = (1/i) - (1/I_0)$$

$$i = \frac{1}{\left(\frac{t}{C_1 V_0} + \frac{1}{I_0}\right)} \quad (4)$$

$$C_1 V_1 = \int_0^t i\, dt = \int_0^t \frac{dt}{\left(\frac{t}{C_1 V_0} + \frac{1}{I_0}\right)}$$

$$= \left[ C_1 V_0 \log \left(\frac{t}{C_1 V_0} + \frac{1}{I_0}\right)\right]_0^t$$

$$= C_1 V_0 \left\{ \log \left(\frac{t}{C_1 V_0} + \frac{1}{I_0}\right) - \log \frac{1}{I_0}\right\}$$

$$= C_1 V_0 \log \left(\frac{I_0 t}{C_1 V_0} + 1\right)$$

Therefore, $$C_1 V_1 = C_2 V_2 = C_1 V_0 \log \left(\frac{I_0 t}{C_1 V_0} + 1\right)$$

$$V_1 = V_0 \log \left(\frac{I_0 t}{C_1 V_0} + 1\right) \quad (5)$$

$$V_2 = \frac{C_1 V_0}{C_2} \log \left(\frac{I_0 t}{C_1 V_0} + 1\right) \quad (6)$$

As shown in formula (6) the increase of charging voltage $V_2$ of the first input condenser $C_2$ in the differential amplifier circuit is in proportion to the logarithmic value of the time from the time when trigger switch $S_4$ is electrified.

Figure 4:
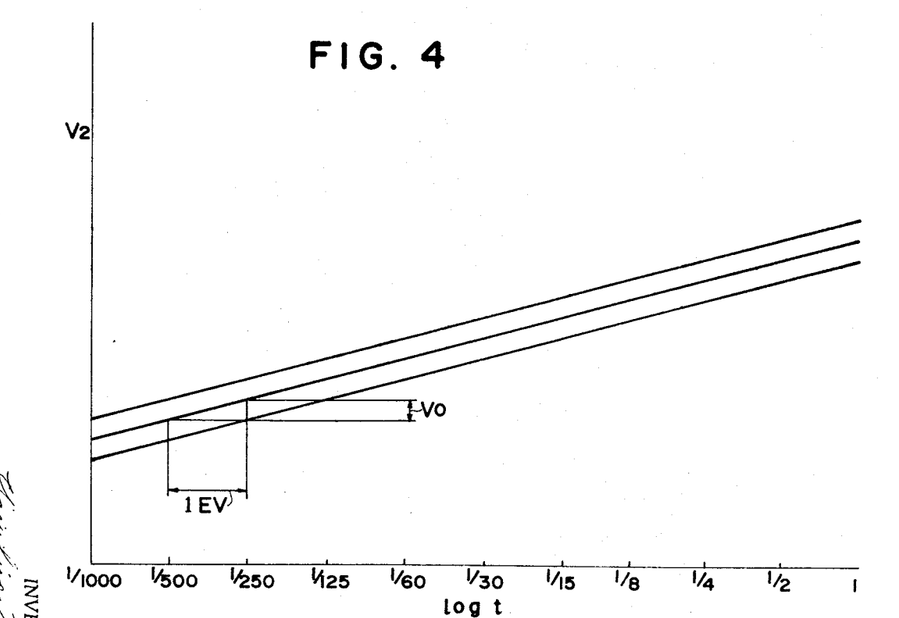
FIG. 4 is a diagram showing the relation between the logarithmic value of the time and the charging voltage after the fixed base voltage constituting the reference time integrating circuit in accordance with the present invention is impressed and the trigger switch for the condenser inserted in the collector circuit of the transistor is closed.

In FIG. 4 the relation between charging voltage $V_2$ of said condenser $C_2$ and the time from the time when trigger switch $S_4$ is electrified is shown.

Upon changing the setting film sensitivity and stop value the resistance value of variable resistance $R_4$ undergoes a change and the bias voltage at the first stage of condenser $C_2$ is changed, so that as shown in FIG. 4 the time characteristic of charging voltage $V_2$ is moved in parallel by changing the film sensitivity and stop value.

By the way, by changing the capacity ratio of condensers $C_1$, $C_2$ it is possible to obtain any charging characteristic of condenser $C_2$.

Figure 6:
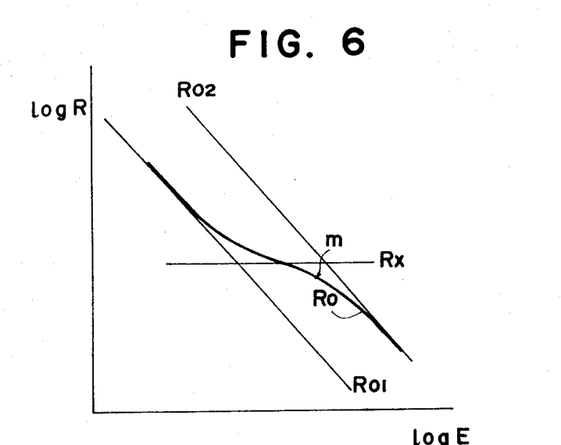
FIG. 6 is a diagram showing the relation between the illuminances on the light receiving portion of said composite photoconductive element and on the light receiving face of the fixed resistance, and the respective resistance value.

Photoconductive element $R_o$ is a composite photoconductive element and formed as shown in FIG. 5, and photoconductive elements $R_{o1}$, $R_{o2}$ which are the formation elements of said photoconductive element $R_o$ have the characteristic as shown in FIG. 6 relative to the logarithmic value of the illuminance on the light receiving surface, and fixed resistance $R_x$ also has the value as shown in FIG. 6, therefore, composite photoconductive element $R_o$ has the characteristic as shown by the thick line in FIG. 6 relative to the logarithmic value of the illuminance on the light receiving surface.

Figure 7:
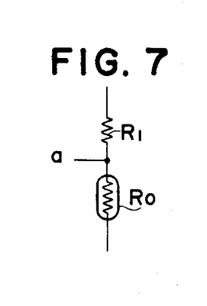
FIG. 7 is a partial view of the photometric circuit in which the composite photoconductive element shown in FIG. 5 is connected in series to the fixed resistance.
Figure 8:
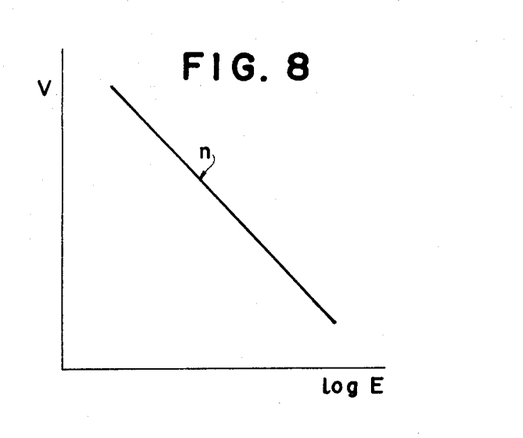
FIG. 8 is a diagram showing the relation between the electric potential at the connection point in the circuit shown in FIG. 7 and the light receiving illuminance.

FIG. 7 shows the circuit in the case of that composite photoconductive element $R_o$ having the illuminance on the light receiving surface — the resistance characteristic shown in FIG. 6 is connected in series to fixed resistance $R_1$, and FIG. 8 shows the relation between the electric potential (volt) thereof and the illuminance on the light receiving surface, and the electric potential at contact a is given the logarithmic compression to the illuminance on the light receiving surface and undergoes a change by $V_o$ relative to the variation of one grade of the illuminance on the light receiving surface (1 EV).

In the case of the present invention, therefore, by changing the circuit constant of the reference time integrating circuit (for example, the capacity ratio of condensers $C_1$, $C_2$, the base voltage of transistor $Tr_2$) the slope of the charging characteristic of condenser $C_2$ shown in FIG. 4 is optionally changed and the variation quantity per 1 EV in the logarithmic compression progress shown in FIG. 6 can be made to the highest precision value in accordance with the power voltage used and the photometric range.

In the case of giving the logarithmic elongation by means of a well known logarithmic elongation element, however, the variation quantity in the logarithmic compression progress for changing 1 EV by the output in the elongation progress is restricted by the characteristic of the logarithmic elongation element and the variation quantity in the logarithmic progress is little and the precision in the elongation progress gets worse.

For example, according to the experimental data of this inventor, in the case of that a transistor is put to use in the logarithmic elongation progress the variation quantity per 1 EV of the input in the logarithmic elongation progress is restricted to 18 mV at the base voltage because of the characteristics of the base voltage and the collector current of the transistor, however, when a comparison circuit according to the present invention is put to use the variation quantity per 1 EV in the logarithmic compression progress can be optionally changed, therefore, under the condition that the film sensitivity is on eleven grades (from ASA6 to ASA6400), the stop value on eight grades (from F14 to F16), the shutter speed of eleven grades (from 1/1000 second to 1 second), and the power voltage is 3V, the variation quantity per 1 EV in the logarithmic compression progress can be made to 80 mV.

Therefore, the variation quantity per 1 EV in the logarithmic compression progress becomes more and accordingly the exposure time control in high precision becomes possible.

Besides, in the case of the present invention; the information of the film sensitivity and stop value is impressed in the first input of the differential amplifier circuit as the bias voltage for condenser $C_2$, and to the second input of the differential amplifier circuit the information of the illuminance on the light receiving surface of the photoconductive element is added in being given the logarithmic compression, therefore, after the photometry is given with the opening photometry, when seeing the focal depth by stopping down the diaphragm diameter of an exchange lens the illuminance on the light receiving surface of the photoconductive element is memorized in memory condenser $C_3$ by connecting switch $S_3$ to contact b from contact a, and then even though the stop value is changed to the desired focal depth the information of the stop value interlocks with condenser $C_2$ as the bias voltage and has no relation to memory condenser $C_3$, so that even after stopped down it is possible to change to any stop value.

Figure 9:
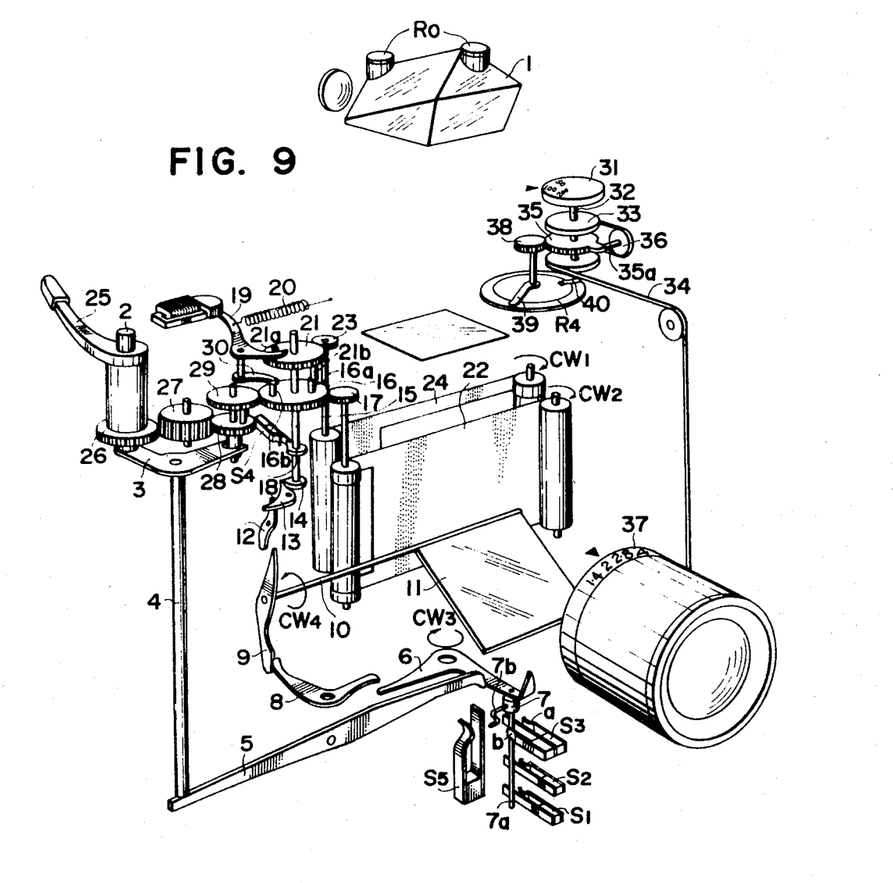
FIG. 9 is a perspective view showing the essential portion of an embodiment of the exposure time control device in accordance with the present invention.

FIG. 9 is a perspective view showing the essential portion of the embodiment of the mechanical interlocking relation between the shutter mechanism, and the electromagnetic resistance body, the switch, and so on in the case of that the exposure time control circuit shown in FIG. 2 is applied to a "through the lens" photometric type focal plane single reflex camera.

In the photometric state, ammeter A indicates the exposure time. Photoconductive element $R_o$ is provided on pentagonal prism 1 to do photometry.

Now, upon pushing shutter button 2 interlocking lever 3 is pushed down and lever 5 is turned counterclockwise by interlocking rod 4 to disengage from switch lever 6 having the turning tendency to the direction shown by arrow $CW_3$, and pin 7a of insulation member 7 attached to said switch lever 6 to switch over switches changes over change over switch $S_3$ to contact b from contact a and simultaneously cuts off switches $S_1$, $S_2$, and thereby charging to condensers $C_1$, $C_2$ becomes possible.

After change over switch $S_3$ is cut off from contact a, said pin 7a of insulation member 7 electrifies main switch $S_5$ to excite electromagnetic coil M.

After main switch $S_5$ is electrified switch lever 6 turns mirror lever 9 to the direction shown by arrow $CW_4$ through intermediate lever 8 to let spindle 10 turn reflector 11 to the same direction. And accordingly, by the turning of said reflector 11 the photometric state is changed over to the photographic state and the quantity of incident light to photoconductive element $R_o$ decreases gradually, however, change over switch $S_3$ has already changed over to contact b from contact a, so that memory condenser $C_3$ has memorized the resistance of photoconductive element $R_o$ at the photometric state.

In the final progress, mirror lever 9 engages with release lever 12 to turn it, and the pawl of opening screen restraining lever 13 disengages from restraining plate 14, and said restraining plate 14 turns together with the opening screen shaft having the turning tendency to the direction shown by arrow $CW_2$ through spindle 15 and gears 16, 17, and opening screen 22 starts to open the shutter. And, at the same time protuberance 18 provided fixedly on said spindle 15 turns counterclockwise to close trigger switch $S_4$ for condensers $C_1$, $C_2$, so that charging to condensers $C_1$, $C_2$ is started.

However, the closing screen is in being checked to run by closing screen restraining lever 19 attracted by electromagnetic coil M.

When the voltage of condenser $C_2$ gets to the memory voltage of condenser $C_3$ electromagnetic coil M is demagnetized and rear screen restraining lever 19 is turned clockwise by spring 20 not to engage with pin 21a and permit gear 21 to turn, so that shutter closing screen 24 starts to run through gear 23 to close the shutter.

Upon turning winding lever 25 counter-clockwise, the film (not shown in the drawing) is wound and at the same time gear 16 is rotated clockwise through gear 26 integral to winding lever 25, gear 27, gear 28, and gear 29, and gear 21 also is rotated through pin 16a and pin 16b, and when restraining plate 14 integral to gear 16 engages with the pawl of opening restraining lever 13 the shutter charge is finished.

When the shutter charge is finished pin 16b of gear 16 turns lever 30 counter-clockwise, and closing screen restraining lever 19 integral to lever 30 is turned counter-clockwise against spring 20 to form the well known holding magnet.

As to interlocking wire 34, one end thereof is connected to pulley 33 rotated in a body with film sensitivity setting dial 31 by spindle 32 and the other end thereof is secured to diaphragm setting ring 37 on the lens barrel through pulley 36 pivoted on arm portion 35a projected to the radius direction from gear 35 fitted loosely on said spindle 32. And, slide brush 39 provided on the insulation spindle of gear 38 meshed with said gear 35 is arranged to slide on variable resistance $R_4$.

Therefore, upon setting up the film sensitivity by film sensitivity setting dial 31 and setting up the stop value by diaphragm setting ring 37, slide brush 39 slides on variable resistance $R_4$ so as to get to the resistance value corresponding to the setting film sensitivity and the setting stop value. By the way, brush 40 is a fixed brush.

When using the camera, electric power switch $S_1$ is electrified. The mechanism for changing over switch $S_3$ to contact b from contact a when stopping down the diaphragm diameter for the exchange lens is simple so that it is omitted in the drawings.

Figure 10:
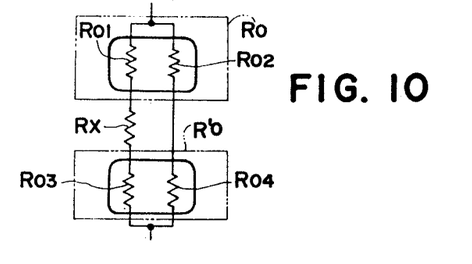
FIG. 10 shows a circuit diagram making use of two composite photoconductive elements in the light receiving portion of another embodiment in accordance with the present invention.

FIG. 10 shows an another embodiment in accordance with the present invention, wherein instead of the light receiving element in the photometric circuit shown in FIG. 5 two composite photoconductive elements $R_o$, $R_o{'}$ are connected in series, and provided that the elements for constituting said composite photoconductive element $R_o$ are $R_{o1}$, $R_{o2}$ and the elements for constituting other composite photoconductive element $R_o{'}$ are $R_{o3}$, $R_{o4}$, the illuminance-resistance characteristic of respective element is as follows:

$$R_{o1} = R_{o3} = K_1 L^{-\gamma} \ , R_{o2} = R_{o4} = K_2 L^{-\gamma}$$

and, by said both composite photoconductive elements the photographic field is divided to do photometry, and thereby for objects different in the brightness ratio the proper average photometry can be effected.

What is claimed is:

1. An automatic shutter control device for a single lens reflex camera of the type having a photoconductive member receiving light from an object to be photographed via an objective lens, comprising:
   means for generating a first output voltage proportional to the logarithm of intensity of light incident on said photoconductive member;
   means for storing said first output voltage;
   means for separating said means for storing from said means for generating a first output voltage with the shutter release operation;
   means for generating a second output voltage as a function of a manually set exposure condition;
   a transistor;
   means for applying constant voltage to the base of said transistor;
   a first integrating means connected to the emitter of said transistor for generating a signal that changes in propor-tion to the logarithm of an elapsed time period initiated by the shutter release operation;
   means for initiating operation of said first integrating means in response to the shutter release operation;
   means for generating a control signal when said signal plus said second output voltage are substantially equal to said first output voltage; and
   means for actuating shutter closing operation in response to said control signal.

2. An automatic shutter control device as in claim 1, further comprising second integrating means connected to the collector of said transistor for generating a third output voltage which changes in response to the change of said signal of said first integrating means, and said means for generating a control signal includes a comparing circuit for comparing said signal plus said second output voltage with said first output voltage.

3. An automatic shutter control device as in claim 2, wherein said photoconductive member comprises two parallelly connected photoconductive elements and said means for generating a first output voltage includes said photoconductive elements, a compensation resistor connected to at least one of said photoconductive elements and an output resistor connected to said compensation resistor to generate said first output voltage.

4. An automatic shutter control device as in claim 3, wherein said comparing circuit includes a differential amplifier circuit having a first input terminal to which said first output voltage is applied and a second input terminal to which both said second and third output voltages are applied and said means for generating a second output voltage biases said second integrating means.

5. An automatic shutter control device as in claim 4, further comprising an electric power source and said means for applying constant voltage includes a second transistor connected between said power source by the emitter and collector thereof and having a base connected to the collector of said second transistor through a resistor, the base of said first transistor being connected to the collector of said second transistor.

6. An automatic shutter control device as in claim 5, wherein said means for generating a first output voltage further includes means for generating a constant current, and said means for generating a second output voltage includes a variable resistor and said constant current flows through said variable resistor.

7. An automatic shutter control device as in claim 6, wherein said first and second integrating means are adjustable for changing the ratio of their respective stored signals.

8. An automatic shutter control device as in claim 7, further comprising means for indicating shutter speed prior to shutter release and responsive to said means for generating a first output voltage.

9. An automatic shutter control device as in claim 8, wherein said means for indicating shutter speed comprises an ammeter having double coils and two transistors in which each collector thereof is connected to a respective one of said double coils, and the base of one of said transistors is connected to said means for generating a first output voltage and the base of the other transistor is connected to said means for generating a second output voltage.

10. An automatic shutter control device for a single lens reflex camera of the type having a photoconductive member receiving light from an objective to be photographed via an objective lens, comprising:
   an electric power source;
   a detecting circuit including said photoconductive member connected to said electric power source for generating a first output voltage proportional to the logarithm of intensity of light incident on said photoconductive member;
   a change over switch;
   a storage means connected to said detecting circuit through said change over switch prior to exposure of the shutter for storing said first output voltage;
   means including a variable resistor for generating a second output voltage as a function of an exposure condition manually set in the camera;

a transistor;

means for applying a constant voltage to the base of said transistor;

a first capacitance connected to the emitter of said transistor so that terminal voltage of said capacitor changes in proportion to the logarithm of an elapsed time period;

means for initiating the change of said terminal voltage of said first capacitor in response to opening operation of the shutter;

a second capacitor connected to the collector of said transistor and switch means for connecting said collector to said means for generating a second output voltage;

a differential amplifier circuit having two transistors, the base of one of said transistors is connected to the collector of said transistor and the base of the other transistor is connected to said storage means through said change over switch interlocked with the opening operation of the shutter for generating an output signal when the base potentials of both said transistors are substantially equal; and an electromagnet for terminating exposure and responsive to said output signal.

* * * * *